United States Patent [19]

Morio

[11] Patent Number: 4,721,333
[45] Date of Patent: Jan. 26, 1988

[54] ARRANGEMENTS FOR FORMING BUMPER STRUCTURES OF AUTOMOBILES

[75] Inventor: Akie Morio, Hiroshima, Japan

[73] Assignee: Mazda Motor Corporation, Japan

[21] Appl. No.: 938,422

[22] Filed: Dec. 5, 1986

[30] Foreign Application Priority Data

Dec. 10, 1985 [JP] Japan .................................. 60-278570

[51] Int. Cl.$^4$ ............................................. B60R 19/02
[52] U.S. Cl. .................................... 293/146; 293/155; 296/152
[58] Field of Search ................ 293/102, 146, 149, 151, 293/152, 155, 146; 296/56, 152

[56] References Cited

U.S. PATENT DOCUMENTS 3,529,861  9/1970  Deroubaix ............................. 293/146
4,251,103  2/1981  Nakajima et al. ..................... 293/102

FOREIGN PATENT DOCUMENTS 59-110256  1/1983  Japan .

Primary Examiner—Robert R. Song
Attorney, Agent, or Firm—Gerald J. Ferguson, Jr.; Michael P. Hoffman; Michael J. Foycik, Jr.

[57] ABSTRACT

An arrangement for forming a bumper structure of an automobile having a rear door mounted on a body thereof to be openable and closing includes a bumper divided into a lower member fixed to a rear end portion of the body at a position lower than the rear door and an upper member attached to a lower end portion of the rear door. The upper member has end portions elongating oppositely in the direction of the width of the body beyond the rear door. A pair of receiving members are attached to the rear end portion of the body so as to face respectively the end portions of the upper member of the bumper elongating oppositely beyond the rear door when the rear door is closed.

14 Claims, 3 Drawing Figures

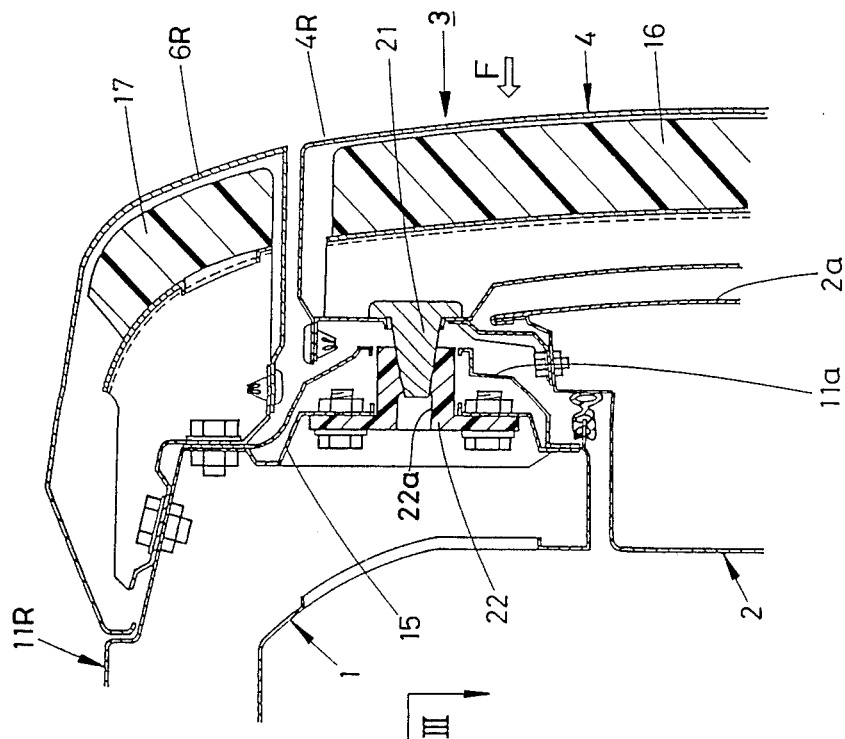
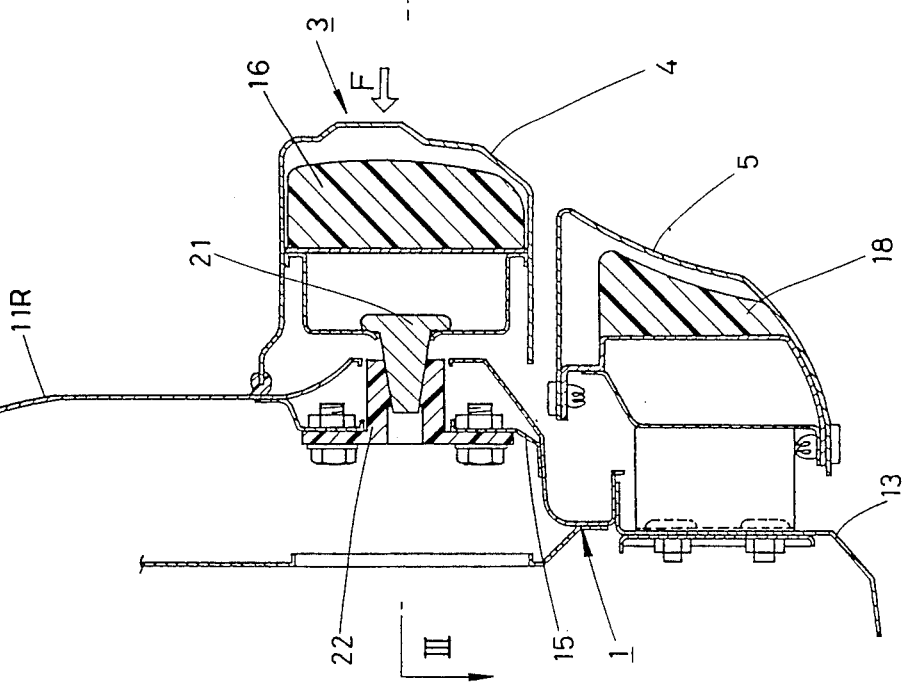

ARRANGEMENTS FOR FORMING BUMPER STRUCTURES OF AUTOMOBILES

BACKGROUND OF THE INVENTION

1. Field of the Invention

The present invention relates generally to arrangements for forming bumper structures of automobiles, more particularly, to an arrangement for forming a rear bumper structure of an automobile of for example, the station wagon type having a rear door.

2. Description of the Prior Art

A conventional automobile is provided with front and rear bumpers, each of which is formed in a body and fixed on a chassis and body construction thereof, as disclosed in, for example, the Japanese utility model application published before examination under publication number 59-110256.

Recently, in an automobile having a baggage room formed in the rear portion of a body thereof and provided with a rear door, such as a station wagon type automobile, it has been proposed to lower the floor level of the baggage room for the purpose of facilitating to load and unload baggages. The automobile having such lowered floor level is accompanied with an opening which is provided for the baggage room at the rear end of the body to be closed by the rear door and shaped to extend to a lower position of the body, together with the rear door also shaped to extend to the lower position. On the other hand, front and rear bumpers mounted on the automobile are required to be fixed on the body at an ordinary level regardless of the lowered floor in the baggage room in view of the relative relationship with bumpers of other automobiles.

Accordingly, in an automobile having a baggage room provided with a rear door such as a station wagon type automobile and with a lowered floor level in such a manner as described above, a position at which a rear bumper is to be mounted on a body of the automobile stretches over both the lower portion of the body and the lower end portion of the rear door which is closed. Consequently, it is considered for the automobile having the baggage room provided with the rear door and the lowered floor level to divide the rear bumper into a lower member fixed to the lower portion of the body and an upper member attached to the lower end portion of the rear door.

The automobile provided with such a bisected rear bumper, however, will come upon a problem that impact load dealt to the upper member of the rear bumper on the occasion of a rear end collision thereto is directly propagated to the rear door and thereby the rear door may be deformed or damaged.

OBJECTS AND SUMMARY OF THE INVENTION

Accordingly, it is an object of the present invention to provide an arrangement for forming a bumper structure of an automobile provided with a rear door, which avoids the aforementioned problems encountered with the previously proposed automobile body construction.

Another object of the present invention is to provide an arrangement for forming a bumper structure of an automobile provided with a rear bumper which is divided into a lower member fixed to the lower end portion of a body thereof and an upper member attached to the lower end portion of a rear door mounted to be openable and closing on the body, with which the rear door is relieved from deformation or damage on the occasion of rear-end collision to the automobile.

A further object of the present invention is to provide an arrangement for forming a bumper structure of an automobile provided with a rear bumper which is divided into a lower member fixed to the lower end portion of a body thereof and an upper member attached to the lower end portion of a rear door mounted to be openable and closing on the body, in which impact load dealt to the upper member of the rear bumper is partially propagated to the body so as to reduce effectively impact load imposed on the rear door.

According to a first aspect of the present invention, there is provided an arrangement for forming a bumper structure of an automobile having a rear door mounted on a body thereof to be openable and closing, which comprises a bumper composed of a lower member fixed to the body at a position lower than the rear door and an upper member attached to a lower end portion of the rear door and provided with end portions extending oppositely in the direction of the width of the body beyond the rear door, and a pair of receiving members attached to a rear end portion of the body so as to face respectively the end portions of the upper member of the rear bumper extending oppositely beyond the rear door when the rear door is closed.

According to a second aspect of the present invention, there is provided an arrangement for forming a bumper structure of an automobile having a rear door mounted on a body thereof to be openable and closing, which comprises a bumper composed of a lower member fixed to the body at a position lower than the rear door and an upper member attached to a lower end portion of the rear door and provided with end portions extending oppositely in the direction of the width of the body beyond the rear door, a pair of receiving members attached to a rear end portion of the body so as to face respectively the end portions of the upper member of the rear bumper extending oppositely beyond the rear door when the rear door is closed, and a pair of protrusions mounted respectively on the end portions of the upper member of the rear bumper for coming into contact with the respective receiving members attached to the rear end portion of the body when the rear door is closed.

In the arrangement thus constituted in accordance with the present invention, impact load dealt to the upper member of the rear bumper on the occasion of rear-end collision to the automobile is partially propagated to the rear end portion of the body through the end portions of the upper member extending oppositely beyond the rear door and the receiving members facing respectively the end portions of the upper member, so that impact load inflicted to the rear door through the upper member of the rear bumper is effectively reduced. Consequently, the rear door is relieved from deformation or damage when the automobile is collided with another automobile or something other than automobiles from behind.

The above, and other objects, features and advantages of the present invention will become apparent from the following detailed description which is to be read in conjunction with the accompanying drawings.

BRIEF DESCRIPTION OF THE DRAWINGS

FIG. 2 is a partial cross-sectional view taken on line II—II of FIG. 1; and

FIG. 3 is a partial cross-sectional view taken on line III—III of FIG. 2.

DESCRIPTION OF THE PREFERRED EMBODIMENTS

Figure 1:
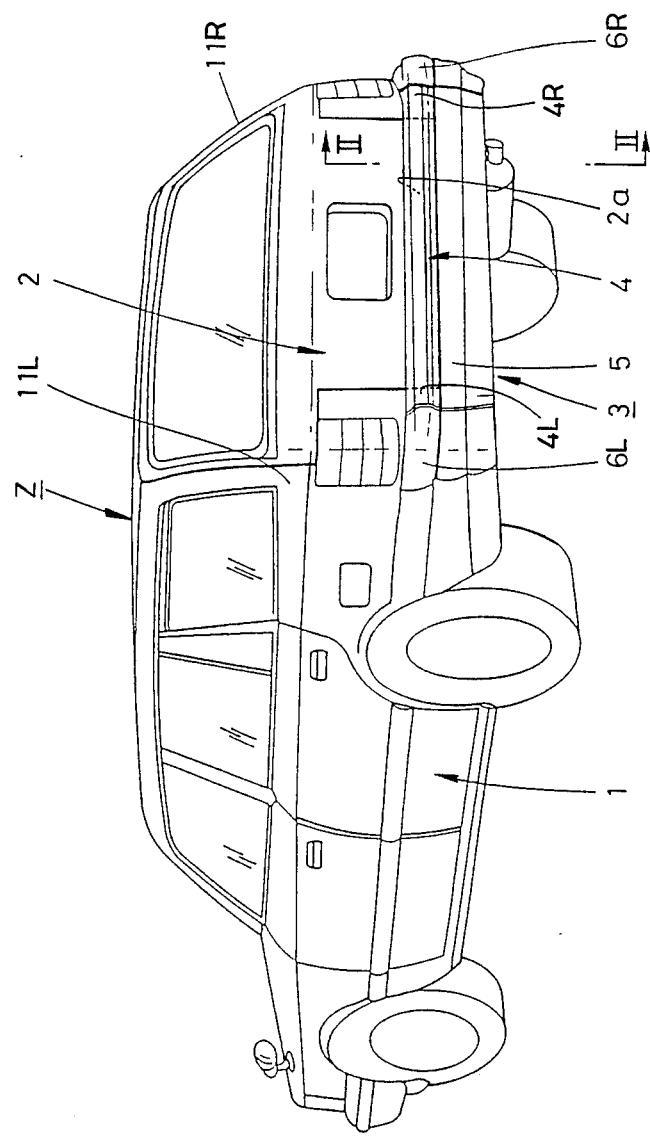
FIG. 1 is a perspective rear view showing an example of a station wagon type automobile to which one embodiment of arrangement for forming a bumper structure of an automobile according to the present invention is applied.

Now, an embodiment of arrangement for forming a bumper structure of an automobile according to the present invention will be described with reference to FIGS. 1 to 3 of the accompanying drawings.

FIG. 1 shows a station wagon type automobile Z which employs an example of the arrangement according to the present invention. This station wagon type automobile Z shown in FIG. 1 has a rear door 2 mounted to be openable and closing on the rear end portion of a body 1. The rear end portion of the body 1 is also provided with a rear bumper 3.

As shown in FIGS. 1 to 3, the rear bumper 3 is divided vertically into an upper member 4 attached laterally to a lower end portion 2a of the rear door 2 and having a rubber cushion 16 contained therein, and a lower member 5 fixed to a rear panel 13 which forms a lower portion of the body 1 at the rear end portion of the latter to be located below the rear door 2 and having a rubber cushion 18 contained therein. Right and left side bumpers 6R and 6L each containing a rubber cushion 17 therein are also fixed to right and left fenders 11R and 11L of the body 1, respectively. The right side bumper 6R is located to be adjacent to both a right end portion 4R of the upper member 4 and the right end portion of the lower member 5, and the left side bumper 6L is located to be adjacent to both a left end portion 4L of the upper member 4 and the left end portion of the lower member 5.

The right and left end portions 4R and 4L of the upper member 4 extend oppositely in the direction of the width of the body 1 beyond the rear door 2, and a substantially truncated conical protrusion 21 is disposed on each of inner surfaces of the right and left end portions 4R and 4L of the upper member 4, as shown in FIG. 3. Further, a receiving member 22 made of rubber is mounted on a bracket 15 attached to a rear end portion 11a of each of the right and left fenders 11R and 11L of the body 1 at the inside thereof, as shown in FIG. 3. These receiving members 22 face the inner surfaces of the right and left end portions 4R and 4L of the upper member 4, respectively, when the rear door 2 is closed. The receiving member 22 is provided with a tapered opening 22a and the substantially truncated conical protrusion 21 disposed on each of the inner surfaces of the right and left end portions 4R and 4L of the upper member 4 is inserted into the tapered opening 22a provided in the receiving member 22 to engage with the same when the rear door 2 is closed.

In the station wagon type automobile Z described above, the rear bumper 3 composed of the upper member 4 and the lower member 5, the right and left side bumpers 6R and 6L, and the receiving members 22 inclusive constitute one example of the arrangement according to the present invention.

With such a body construction, when impact load is dealt to the upper member 4 on the rear door 2 from behind, as indicated with an arrow F in FIGS. 2 and 3, the impact load is partially propagated to the rear end portions of the right and left fenders 11R and 11L of the body 1 through the right and left end portions 4R and 4L of the upper member 4 extending oppositely beyond the rear door 2 and the receiving members 22 engaging with the respective protrusions 21 disposed on the inner surfaces of the right and left end portions 4R and 4L, and therefore impact load inflicted to the rear door 2 through the upper member 4 of the rear bumper 3 is effectively reduced. As a result, the rear door 2 is relieved from deformation or damage when the station wagon type automobile Z is collided with, for example, another automobile from behind.

In addition, since the receiving member 22 is made of rubber, the impact load propagated to the rear end portions of the right and left fenders 11R and 11L of the body 1 from the upper member 4 is partially absorbed by the receiving member 22. This is advantageous in view of reduction of shock inflicted to a driver and protection of the body 1.

Although the substantially truncated conical protrusion 21 disposed on each of the inner surfaces of the right and left end portions 4R and 4L of the upper member 4 of the rear bumper 3 is inserted into the tapered opening 22a provided in the receiving member 22 provided on the body 1 in the embodiment described above, it is to be understood that the present invention is not limited thereto, and the protrusion 21 may be designed to cause its end surface to come into contact with the upper surface of the receiving member 22 when the rear door 2 is closed.

What is claimed is:

1. An arrangement for forming a bumper structure of an automobile having a rear door mounted on a body thereof to be openable and closing, the arrangement comprising;

a bumper including a lower member fixed to a rear end portion of the body at a position lower than the rear door and an upper member attached to a lower end portion of the rear door, said upper member having end portions elongating oppositely in a direction of the width of the body beyond the rear door, and a pair of receiving members attached to the rear end portion of the body so as to bear relation to said end portions of said upper member elongating oppositely beyond the rear door when the rear door is closed so that an impact load dealt to said upper member of the bumper from behind is partially propagated through said receiving members to the body and thereby impact load imposed on the rear door is reduced.

2. An arrangement for forming a bumper structure of an automobile having a rear door mounted on a body thereof to be openable and closing, the arrangement comprising:

a bumper including a lower member fixed to a rear end portion of the body at a position lower than the rear door and an upper member attached to a lower end portion of the rear door, said upper member having end portions elongating oppositely in the direction of the width of the body beyond the rear door, a pair of receiving members fixed to the rear end portion of the body so as to face respectively said end portions of said upper member elongating oppositely beyond the rear door when the rear door is closed, and a pair of protrusions mounted respectively on the end portions of said upper member for coming into contact with said receiving members respectively when the rear door is closed.

3. An arrangement according to claim 2, wherein each of said protrusions is formed into the shape of a substantially truncated cone projecting toward the rear end portion of the body when the rear door is closed.

4. An arrangement according to claim 3, wherein each of said receiving member is provided with an opening into which one of said protrusions is inserted when the rear door is closed.

5. An arrangement according to claim 4, wherein each of said receiving member is made of elastic material.

6. An arrangement according to claim 5, wherein each of said receiving member is mounted on a bracket attached to a rear end portion of a rear fender constituting the body at the inside of said rear fender.

7. An arrangement according to claim 2, wherein each of said lower and upper members constituting the bumper has an elastic cushion contained therein.

8. An arrangement according to claim 2 further comprising a pair of side bumpers fixed to right and left side portions of the body, respectively, one of said side bumpers being located to be adjacent to both a right end of said lower member and a right end of said upper member and the other of said side bumpers being located to be adjacent to both a left end of said lower member and a left end of said upper member.

9. An arrangement according to claim 8, wherein each of said protrusions is formed into the shape of a substantially truncated cone projecting toward the rear end portion of the body when the rear door is closed.

10. An arrangement according to claim 9, wherein each of said receiving members is provided with an opening into which one of said protrusions is inserted when the rear door is closed.

11. An arrangement according to claim 10, wherein each of said receiving members is made of elastic material.

12. An arrangement according to claim 11, wherein each of said receiving members is mounted on a bracket attached to a rear end portion of a rear fender constituting the body at the inside of said rear fender.

13. An arrangement according to claim 1, wherein each of said receiving members is made of elastic material.

14. An arrangement according to claim 13 further comprising a pair of side bumpers fixed to right and left side portions of the body, respectively, one of said side bumpers being located to be adjacent to both a right end of said lower member and a right end of said upper member and the other of said side members being located to be adjacent to both a left end of said lower member and a left end of said upper member.

* * * * *